UNITED STATES PATENT OFFICE.

CHARLES LOWE, OF REDDISH, NEAR STOCKPORT, COUNTY OF LANCASTER, ENGLAND.

COLORING-MATTER DERIVED FROM AURIN.

SPECIFICATION forming part of Letters Patent No. 307,401, dated October 28, 1884.

Application filed March 11, 1884. (No specimens.) Patented in England November 22, 1882, No. 5,554.

*To all whom it may concern:*

Be it known that I, CHARLES LOWE, a subject of the Queen of Great Britain, residing at Reddish, near Stockport, in the county of Lancaster, England, manufacturing chemist, have invented certain new and useful Improvements in the Manufacture of Coloring-Matters from Coal-Tar Products, (for which I have obtained Letters Patent in Great Britain, No. 5,554, dated November 22, 1882;) and I do hereby declare that the following is a full, clear, and exact description of the invention, which will enable others skilled in the art to which it appertains to make and use the same.

The object of my invention is to manufacture by new and improved processes basic and conjugated acid red coloring-matters, which I respectively designate under the names "roso-phenoline" and "roso-phenoline sulphonic acid," from the product well known to chemists generally under the names of "aurin" or "yellow coralline," and this object I carry into effect by the methods described below.

To obtain the basic red coloring-matter, which I designate as "roso-phenoline," and its salts, I heat to a temperature between two hundred and twelve degrees Fahrenheit and four hundred degrees Fahrenheit (212° Fahrenheit and 400° Fahrenheit) the aurin, with a mixture or combination of ammonia and an organic acid either in aqueous, ethylic, phenylic, or other alcoholic solution, either in open vessels at ordinary atmospheric pressure or in closed vessels at a pressure superior to ordinary atmospheric pressure, until the aurin is converted into the red coloring-matter named. By preference I employ benzoic acid, although other organic acids may be satisfactorily substituted for it in the mixture or combination above described. The duration of the operation will vary with the quantities of material and the degree of pressure employed.

The following proportions will give a good result, although they may be considerably varied without materially affecting the economy and successful working of the process, as will be understood by all chemists: aurin, one part; aqueous, ethylic, phenylic, or other alcoholic solutions of ammonia, ten parts; benzoic or other organic acid, one part. The coloring-matter thus produced is purified for the market either in its basic state or converted into a salt by any of the general processes well known and applied by all chemists for similar purposes.

The conjugated acid red coloring-matter above referred to, and which I call and describe as "roso-phenoline sulphonic acid," I manufacture in two ways.

First method: I take one part of the basic red coloring-matter, the preparation of which is described above, and which I call "roso-phenoline," or its salts, and heat it with five parts sulphuric acid at a temperature between two hundred and twelve degrees and four hundred degrees (212° and 400°) Fahrenheit until it is almost or altogether transformed into a sulphonic acid of the base roso-phenoline. The excess of sulphuric acid is removed by the usual processes employed by chemists or manufacturers for similar purposes, and the sulphonic acid of the base roso-phenoline may either be utilized as such or converted into a salt in the usual well-known manner for more convenient application to industrial purposes.

Second method: I take one part aurin or yellow coralline and heat it at a low temperature, between one hundred degrees and two hundred and twelve degrees (100° and 212°) Fahrenheit, with five parts sulphuric acid, so as to convert it into aurin sulphonic acid, and the product, obtained after separation of the excess of sulphuric acid in the usual manner well known to chemists, I heat with ammonia either in aqueous, ethylic, phenylic, or other alcoholic solution, either in open vessels at ordinary atmospheric pressure or in closed vessels at pressures exceeding that of the atmosphere, until the coloring-matter designated by me under the name of "roso-phenoline sulphonic acid" is produced.

The ammoniacal salt of the roso-phenoline sulphonic acid thus prepared may be employed for dyeing purposes as such, or may be further purified by any of the well-known general processes applicable to the purification of sulphonic acids and their salts.

The second method or process herein described forms the subject-matter of a separate application filed July 5, 1884, and therefore is not claimed herein.

Having stated the nature of my invention and described the manner of performing the same, I declare that what I claim as my invention, and desire to secure by Letters Patent of the United States, is—

The process of manufacturing basic red coloring-matter, which I designate "roso-phenoline," from coal-tar products, such process consisting in heating aurin with a mixture of ammonia and an organic acid either in aqueous, ethylic, phenylic, or other alcoholic solution, substantially as herein set forth.

The foregoing specification of my improvements in the manufacture of coloring-matters from coal-tar products signed by me this 26th day of February, 1884.

CHAS. LOWE.

Witnesses:
    H. B. BARLOW,
    S. WALKEY GILLETT,
*Both of 17 St. Ann's Square, Manchester.*